April 10, 1934.    G. G. MORENO    1,954,255
FILM MAGAZINE AND CARRIER FOR THE SAME
Filed July 6, 1931    2 Sheets-Sheet 1
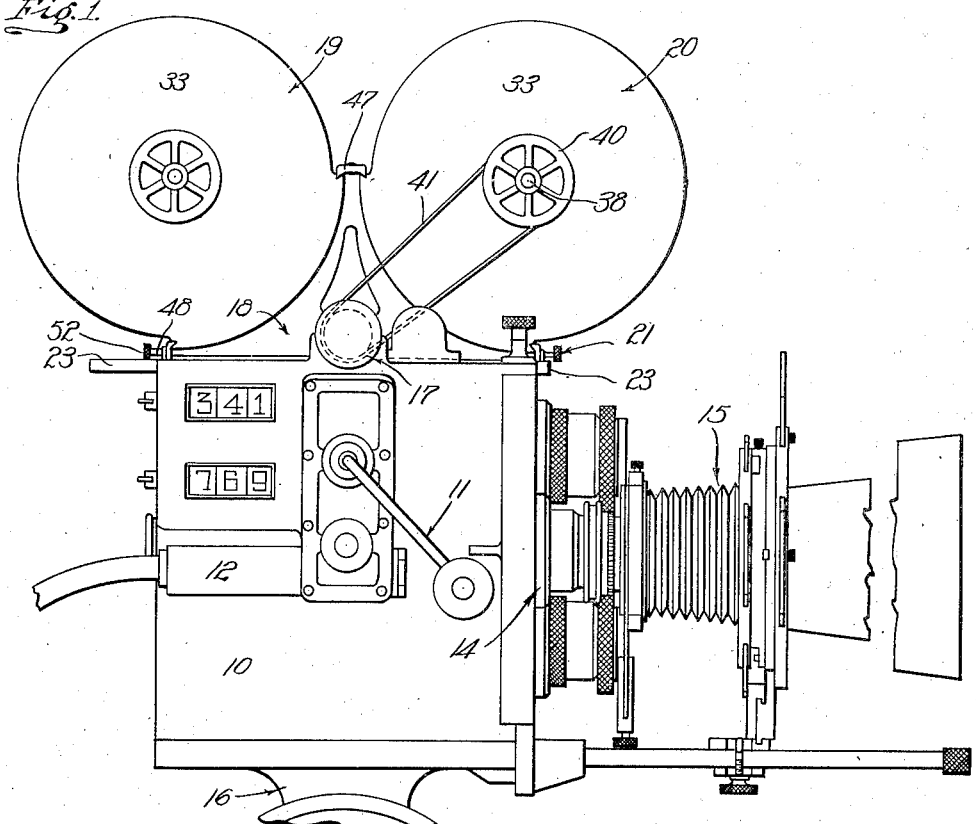
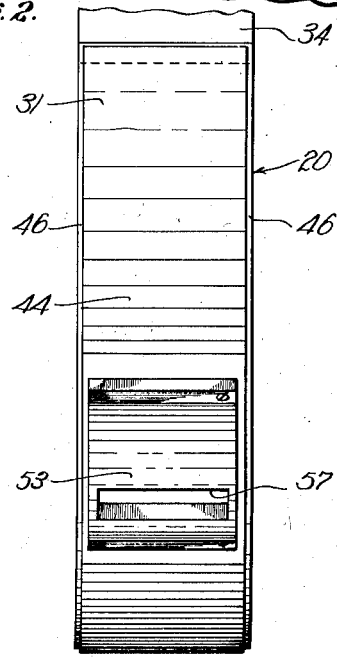
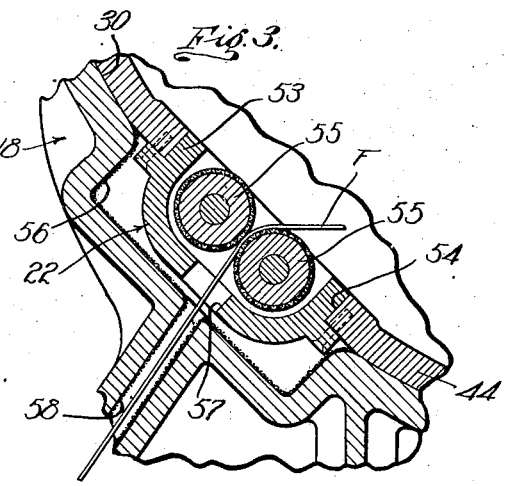
Inventor
Gabriel Garcia Moreno
By
His Attorney April 10, 1934.    G. G. MORENO    1,954,255
FILM MAGAZINE AND CARRIER FOR THE SAME
Filed July 6, 1931    2 Sheets-Sheet 2
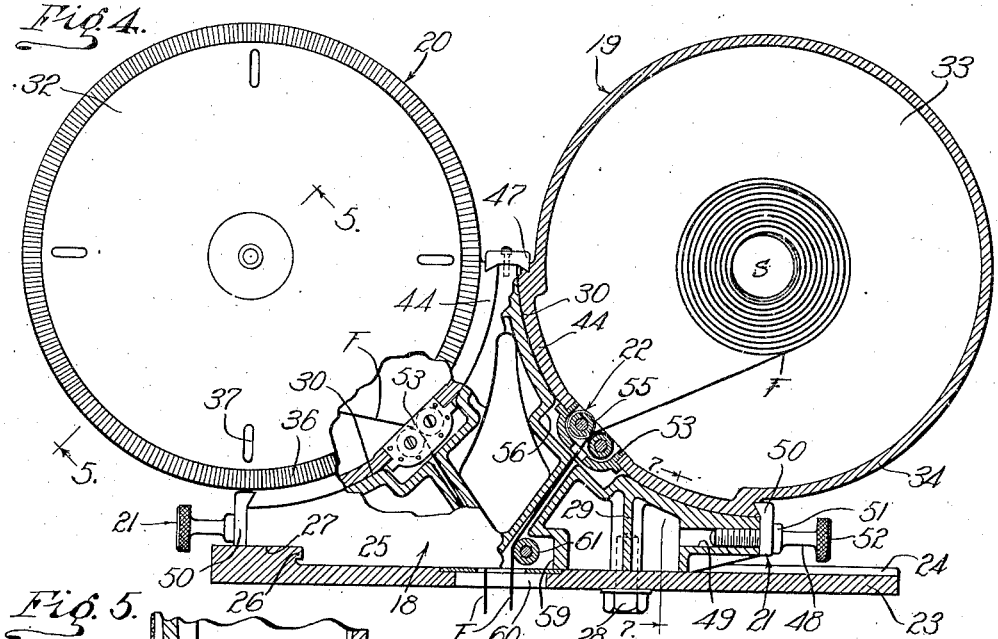
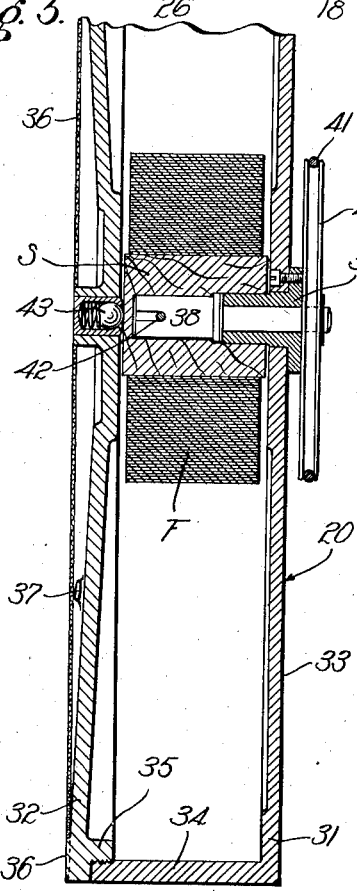
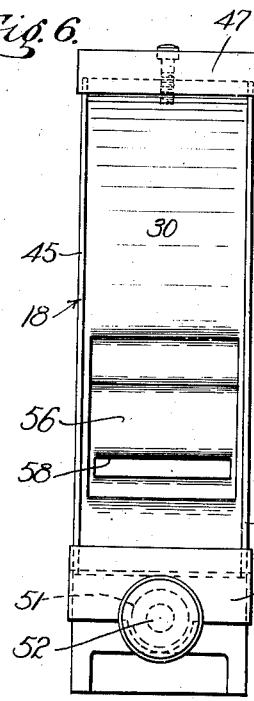
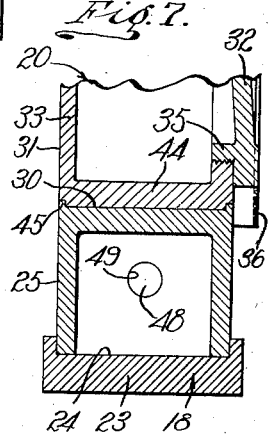
Inventor
Gabriel Garcia Moreno
By W. P. Maxwell
His Attorney Patented Apr. 10, 1934

1,954,255

UNITED STATES PATENT OFFICE 1,954,255

FILM MAGAZINE AND CARRIER FOR THE SAME

Gabriel Garcia Moreno, Los Angeles, Calif.

Application July 6, 1931, Serial No. 548,934

7 Claims. (Cl. 242—71)

This invention relates to motion picture apparatus, and relates more particularly to a film magazine assembly for use on a motion picture camera. It is a general object of the invention to provide a simple, practical, and improved film magazine assembly for use on a motion picture camera, or the like.

An object of the invention is to provide a construction including a carrier, a plurality of like or identical film magazines in the form of independent units, and means for independently detachably mounting the magazines on the carrier.

An important object of the present invention is to provide a construction or assembly of the character referred to in which two like film magazines are detachably mounted on a base or carrier to be applied to a motion picture camera. In accordance with the present invention, the delivery magazine for carrying the supply of film for passage through the camera may, when emptied, be employed as the receiving or take-up magazine for receiving film after its passage through the camera. As the drums of film magazines are alike in construction and mounting and are independently detachable as units, they are exchangeable one for the other so that a minimum number of magazines is required.

Another object of the invention is to provide an assembly of the character mentioned in which a single light trap is required for each magazine.

Another object of the invention is to provide an assembly of the character mentioned that includes the magazines and carrier and that provides novel and improved means for detachably mounting the magazines on the carrier.

Another object of the invention is to provide an assembly of film magazines and carrier in which the magazines may be easily and quickly mounted on and detached from the carrier.

Another object of the invention is to provide a simple, commercially practical light-tight film magazine or drum for housing sensitized film.

Another object of the invention is to provide a magazine mounting or carrier of the character referred to that is of simple, compact construction and that is light in weight.

Other objects and features of the invention will be best and more fully understood from the following detailed description of a typical form and application of the invention, throughout which description reference will be had to the accompanying drawings, in which:

Fig. 1 is a side elevation of the assembly provided by the present invention, showing it mounted on a motion picture camera. Fig. 2 is an enlarged view of a portion of the edge of one of the magazines. Fig. 3 is an enlarged vertical detailed sectional view of the light trap of one of the magazines and of a portion of the carrier. Fig. 4 is an enlarged side elevation of the assembly provided by the present invention with certain parts broken away to illustrate a magazine and a portion of the carrier in vertical section. Fig. 5 is an enlarged detailed sectional view of one of the magazines, being a view taken as indicated by line 5—5 on Fig. 4. Fig. 6 is an enlarged end or edge view of the carrier with the magazines removed, and Fig. 7 is an enlarged detailed sectional view taken as indicated by line 7—7 on Fig. 4.

The film magazine assembly or construction provided by the present invention is adapted to be employed on motion picture cameras and apparatus of various characters. In the drawings, I have illustrated the invention in connection with a camera of the character fully described and claimed in my co-pending application entitled Light gauging apparatus, Serial Number 547,642, filed June 29, 1931. The present invention is not primarily concerned with the particular type of motion picture camera illustrated in the drawings and is not to be taken as limited or restricted to the specific form or application illustrated, but is to be taken as including any features or modifications that may fall within the scope of the claims.

The motion picture camera illustrated in Fig. 1 of the drawings includes, generally, a body or case 10, a manual drive or operating means in the form of a hand crank 11, a power drive 12, a lens turret 14 mounted at the front of the case 10 and including a plurality of lenses, a mat box 15 in front of the lens turret 14, a portion of the free head 16 of a tripod for carrying the camera, and a pulley 17 at the upper portion of the case 10 operated or rotated by the mechanism of the camera and provided to operate the spool in the take-up magazine for receiving the film after its passage through the camera.

The present invention provides, generally, a base or carrier 18 to be applied to or mounted on the upper end of the camera case 10, two like film magazines 19 and 20, means 21 for detachably securing the magazines 19 and 20 to the carrier 18, and light traps 22 for the magazines.

The mounting or carrier 18 is intended to be detachably or removably mounted on the upper end of the camera case 10 and is provided to support or carry the magazines 19 and 20. The means for detachably mounting the carrier 18 on the camera case 10 may be varied considerably without departing from the spirit of the invention. In the particular case illustrated in the drawings, an elongated plate 23 is provided on the top or upper end of the camera case to receive the carrier 18. The plate 23 is provided on its upper side with a channel 24 to carry the lower end of the base or carrier 18. The carrier 18 is preferably a hollow structure so as to be light in weight. The lower end of the carrier 18 is supported in the channel 24 and its sides 25 engage the side walls of the channel to hold the carrier against lateral movement. An undercut vertical shoulder or stop 26 is provided at one end of the channel 24 and the carrier 18 is provided in its lower end with a notch 27 to receive the stop. The stop or shoulder 26 fits the notch 27 so as to effectively hold one end of the carrier 18 against vertical displacement from the plate 23. A screw or stud 28 is passed through an opening in the plate 23 and is threaded into an opening in a vertical web 29 of the carrier to detachably secure the carrier to the plate. The carrier 18 projects vertically upward from the plate 23 and its sides 25 may be flat and parallel. The opposite ends of the carrier 18 are curved upwardly and inwardly as illustrated in Figs. 1 and 4 of the drawings to provide curved faces or seats 30 to support the magazines 19 and 20, as will be hereinafter described. The curved or concave seats 30 are of the same extent and curvature and approach each other at the upper end of the carrier 18 so that the carrier tapers upwardly to a comparatively narrow upper edge.

The magazines 19 and 20 are provided to carry the sensitized film and, more particularly, to rotatably carry the spools on which the film is wound. In accordance with the standard practice, the carrier 18 is formed to carry two magazines, one for holding the spool of sensitized film for passage through the camera and one for taking up or receiving the film after its passage through the camera. It is a feature of the present invention that the delivery magazine 19 and the take up magazine 20 are identical in construction and that the base or carrier 18 is constructed so as to detachably mount the magazines so that they may be exchanged one for the other. As the magazines 19 and 20 are alike in construction, I will proceed with a detailed description of the magazine 20, it being understood that such description may apply to the magazine 19.

The film magazine 20 is drum-shaped and includes a body 31 and a removable cover 32 for the body. The body 31 of the magazine may be integral and may consist of a disc-shaped end 33 and an annular axial flange 34. The end 33 forms one side of the magazine, while the flange 34 forms the cylindrical periphery of the magazine. The cover 32 is provided to close the open end of the body 31 and is readily removable to render the interior of the magazine accessible. The cover 32 is provided adjacent its periphery with an inwardly projecting annular flange 35 which is externally screw-threaded to co-operate with a thread on the interior of the flange 34. The engagement between the cover 32 and the flange 34 is such that light is prevented from entering the magazine. An annular row of corrugations 36 and spaced lugs 37 may be provided on the cover to facilitate handling. The magazine may be lined with felt, or fabric.

Means is provided in the magazine for rotatably supporting or rotating a film spool. A spindle or shaft 38 is rotatably carried by a bushing 39 arranged in a central opening in the rigid end 33. The shaft 38 projects outwardly from the bushing and its projecting end carries a pulley 40. When, as in the present instance, the magazine is employed to take up the film after its exposure in the camera, the shaft 38 is rotated by means of a belt 41 passing over the pulleys 40 and 17. In Fig. 5 of the drawings, I have illustrated a typical film spool S arranged on the shaft 38. The spool S has a pin 42 fitting a slot in the shaft. A spring-pressed ball 43 is carried by the cover 32 to yieldingly urge the spool onto the shaft 38 so that the pin 42 is retained in the slot and so that the spool is releasably held in its proper position on the shaft.

The means 21 for detachably mounting the magazines 19 and 20 on the carrier 18 includes parts on the magazines to be engaged by releasable retaining means on the carrier. The two detachable mounting means 21 for securing the magazines 19 and 20 to the carrier 18 are identical and operate to detachably hold the magazines on the curved seats 30 of the carrier. Each magazine is provided at its periphery with an elongated enlargement or flange 44. The flanges 44 extend circumferentially along the exterior of the magazine flanges 34 and are of the same length or extent as the seats 30 of the carrier. The outer sides or faces of the flanges 44 are regular and are of the same curvature as the seats 30 so as to effectively and evenly engage the seats. The flanges 44 are held against lateral or horizontal displacement from the seats 30 by longitudinal ridges 45 extending along the opposite edges of the seats and fitting correspondingly shaped grooves 46 in the flanges 44. The opposite ends of the flanges 44 are undercut or inclined inwardly, as clearly illustrated in Fig. 4 of the drawings.

A clip 47 is mounted on the upper end or edge of the carrier 18 to engage or co-operate with the upper ends of the flanges 44 of the two magazines. The clip 47 projects outwardly at the upper ends of the seats 30 and the lower sides of its projecting parts are inclined downwardly and outwardly to have releasable locking engagement with the undercut upper ends of the magazine flanges 44. Releasable clamping means are provided on the carrier 18 at the lower ends of the seats 30 for engaging the lower ends of the magazine flanges 44 to detachably retain the flanges 44 on the seats 30.

The clamping means are in the nature of screw means, and each includes a screw 48 threaded into an opening 49 in the carrier 18. A clamping plate 50 is provided on each screw 48 to co-operate with the lower end of a flange 44. The clamping plates 50 are free or rotatable on the screws and are held against outward movement on the screws by collars 51. Tht plates 50 project upwardly at the lower ends of the seats 30 and their upper ends have upwardly and inwardly tapered parts for engaging and locking with the undercut ends of the flanges 44. The outer ends of the screw 48 are provided with suitable knurled heads 52. It will be apparent how the screws 48 and clamping plates 50 may be employed to releasably secure the magazines 19 and 20 to the carrier 18. The plates 50 are adapted to be forced or clamped against the lower ends of the flanges 44 so that the upper ends of the flanges are forced against the cap 47 and so that the flanges 44 are tightly held on the seats 30.

A light trap 22 is provided on each of the magazines to prevent the entrance of light to the magazines. Each light trap 22 includes a bracket 53 arranged in an opening 54 in a flange 44. The openings 54 are provided midway between the ends of the flanges 44 so that the magazines may be positioned on either seat 30 of the carrier and have its light trap occur in a corresponding position with respect to the opposite ends of the seats 30. Spaced rollers 55 are rotatably mounted in the bracket 53 to guide and seal about the film F. Black felt, or the like, is provided on the peripheries of the rollers 55 to provide a light seal about the film. The brackets 53 may project outwardly from the flanges 44 and recesses 56 may be provided in the seats 30 to receive the projecting brackets. The recesses 56 may be lined with light-absorbing black felt, or the like. Openings 57 are provided in the outer sides of the brackets 53, and the film F passes through the openings 57 into downwardly and inwardly extending openings 58 in the carrier 18. The openings 58 are preferably lined with felt and terminate at their lower ends in enlargements or sockets 59. The sockets 59 are open at their lower ends and register with an opening 60 in the plate 23. Guide rollers 61 are provided in the sockets 59 to guide the film passing from and to the camera.

It is believed that the operation of the assembly provided by the present invention will be readily apparent from the foregoing detailed description. The magazines 19 and 20 may be easily and quickly arranged on the seats 30 and releasably clamped in position by the screws 48. The magazines are independently and detachably mounted on the carrier so that they may be handled as separate or independent units. Further, the magazines, being detachable from the carrier, may be handled apart from the carrier, and are light in weight and of such shape that they may be readily stacked and handled in groups. The film F may be readily threaded through the light traps 22 and openings 58 to pass through the camera in the proper manner. During operation of the camera, the spindle or shaft 38 of the receiving magazine 20 is rotated through the belt and pulley connection so that the film is wound upon its spool in the proper manner. Upon the film being fully passed through the camera, that is, upon it being completely unwound from the spool of the supply magazine 19 and wound upon the spool of the receiving magazine 20, the emptied supply or delivery magazine 19 may be used to replace the filled receiving magazine 20. The magazines 19 and 20 may be easily and quickly detached from the carrier 18 so that the emptied magazine 19 may be arranged on the forward seat 30 of the carrier and locked in position by the screw 48. A supply magazine may then be positioned and detachably secured on the rear seat 30 of the carrier. In this manner, a minimum number of magazines are required, as the filled receiving magazines may be replaced by the emptied supply magazines. As the magazines which are mounted on the seats 30 are identical, they may be readily exchanged one for the other without being turned end for end or without being inverted. The detachable retaining means 21 are such that the magazines are tightly retained in their proper positions on the seats 30 and yet may be quickly removed for replacement when necessary. The flanges 44 evenly engage the seats 30, and the ridges 45 fit the grooves 46 to prevent the entrance of light to the light traps 22 and the recesses 56. The construction of the magazines is particularly simple and inexpensive, while the carrier 18 is light in weight and very compact.

Having described only a typical preferred form of my invention, I do not wish to limit myself to the specific details set forth, but wish to reserve to myself any changes and variations that may appear to those skilled in the art or fall within the scope of the following clams:

Having described my invention, I claim:

1. In combination, a carrier adapted to be mounted on a motion picture camera, a plurality of like seats on the carrier, a plurality of like film magazines, and means for detachably and independently mounting the magazines on the seats, said means including a projecting part on each magazine adapted to be supported on a seat to have its ends adjacent the opposite ends of the seat, and lock members projecting from the carrier at the opposite ends of each seat for releasably engaging the said ends of the projecting parts.

2. In combination, a carrier adapted to be mounted on a motion picture camera, a plurality of like seats on the carrier, a plurality of like film magazines, each magazine having a part adapted to be supported on a seat to have its ends adjacent the opposite ends of the seat, and means for detachably mounting the magazines on the carrier, said means including a screw-actuated clamp member at an end of each seat for co-operating with an end of a said part.

3. A construction of the character described including, a carrier having like seats on its opposite ends, two like film magazines, and means for independently detachably supporting the magazines on said seats, said means including parts on the magazines to engage said seats, a single clip on the carrier projecting from corresponding ends of both seats and screw-actuated holding members on the carrier at the other ends of the seats for co-operating with the said parts to hold said parts in cooperation with the clip and the seats.

4. A construction of the character described including, a carrier having like seats on its opposite ends, two like film magazines, and means for independently detachably supporting the magazines on said seats, said means including a part on each magazine to engage one of said seats, ridges on the seats to prevent lateral displacement of the parts from the seats a single clip on the carrier to engage an end of both of said parts of the magazines, and means at the other ends of the seats for cooperating with the other ends of said parts to detachably hold the said parts on the seats.

5. In combination, a carrier having like seats on its opposite ends, two independent film magazines, means for independently detachably supporting the magazines on the seats including parts on the magazines for engaging the seats, said parts having openings midway between their ends for passing film, light traps on the magazines at said openings, there being openings in the seats for receiving film passing through the traps, means on the seats and parts for holding the parts against lateral movement on the seats and for preventing the entrance of light to the traps and openings, and means for independently detachably holding the magazines on the carrier including a single clip on the carrier for engaging an end of each of said parts and clamp members on the carrier for engaging the other ends of the parts.

6. In a construction of the character described a carrier adapted to be applied to a camera case and having upwardly converging opposite ends, two independent magazines, each magazine having a part to seat on one of said ends of the carrier, and means for independently detachably mounting the magazines on the carrier including a single clip on the upper end of the carrier projecting from both of said converging ends and adapted to be engaged by the upper ends of the said parts of both magazines, and separate means on the carrier for clamping against the opposite ends of the said parts.

7. In a construction of the character described a carrier adapted to be applied to a camera case and having upwardly converging opposite ends, two independent magazines, each magazine having a part to seat on one of said ends of the carrier, and means for independently detachably mounting the magazines on the carrier including a single clip on the upper end of the carrier projecting from both of said converging ends and adapted to be engaged by the upper ends of the said parts of both magazines and separate screw-actuated clamping members on the carrier for engaging the opposite ends of the said parts.

GABRIEL GARCÍA MORENO.